April 10, 1934.   D. B. KNIGHT   1,954,137
APPARATUS FOR LIFTING LIQUID
Original Filed June 5, 1929
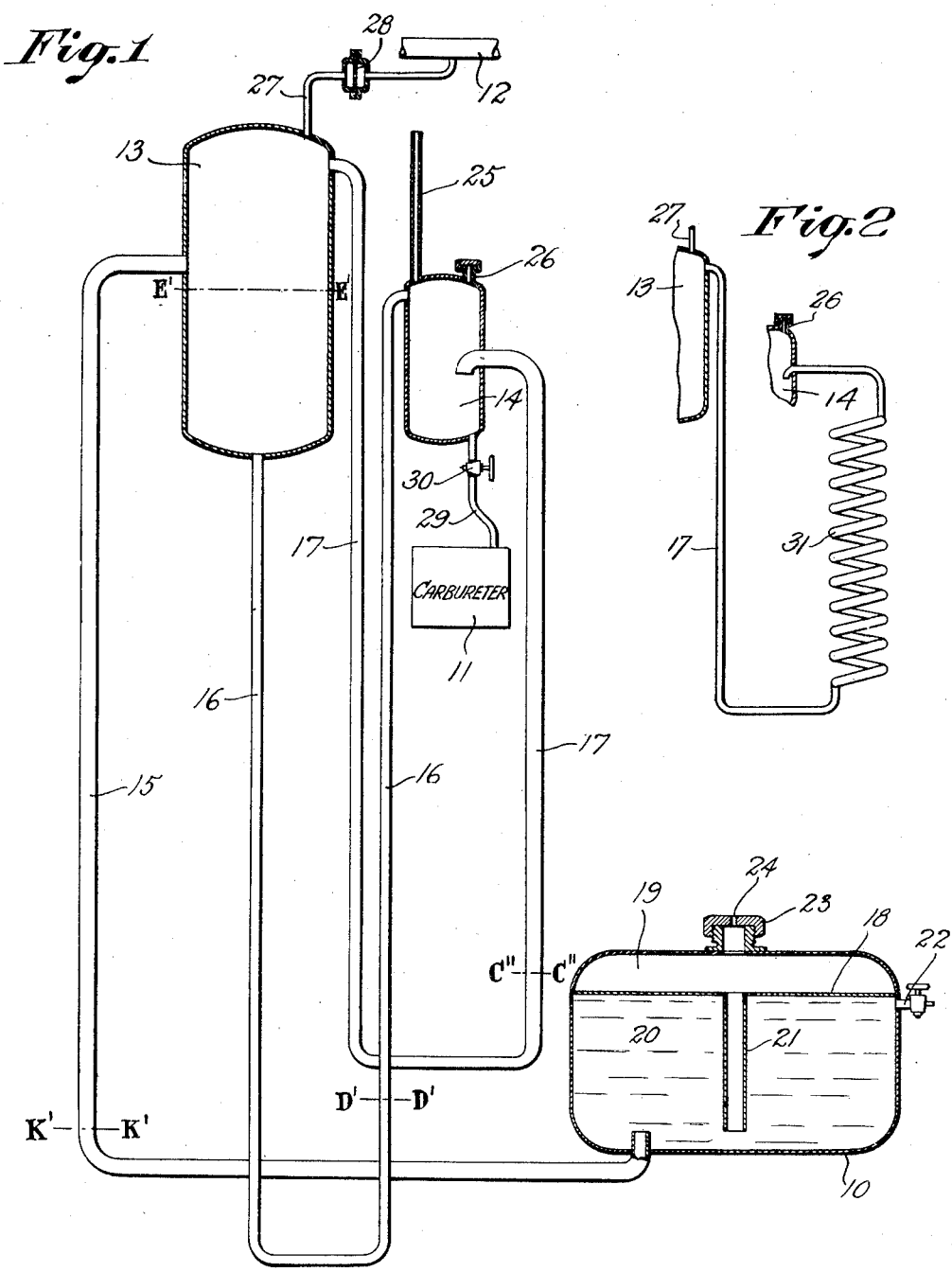
INVENTOR
Donald Branch Knight
BY
Wm J Hedlund
HIS ATTORNEY Patented Apr. 10, 1934

1,954,137

UNITED STATES PATENT OFFICE 1,954,137

APPARATUS FOR LIFTING LIQUID

Donald Branch Knight, Brooklyn, N. Y., assignor to Refrigeration Research Corporation, Brooklyn, N. Y., a corporation of New York Application June 5, 1929, Serial No. 368,461
Renewed March 15, 1932

10 Claims. (Cl. 103—236)

My invention relates to the art of pumping or flowing liquids and one object of my invention is to lift liquid by means of a pressure differential due to suction without employing any moving parts. More particularly, my invention relates to apparatus for and method of lifting gasoline from a tank on an automobile to a carbureter or like device arranged at a higher level.

The nature of the invention will become apparent upon consideration of the following description taken in conjunction with the accompanying drawing which constitutes a part of the specification and on which:

Fig. 1 shows, more or less diagrammatically, one embodiment of my invention; and Fig. 2 shows a portion of the apparatus illustrated in Fig. 1 and embodying a modification of my invention.

Reference character 10 designates a lower fluid container, which in gasoline supply system may be the supply tank. This container is what is generally known as the gas tank of an automobile and may be situated at the rear end at a relatively low level. Reference character 11 designates a carbureter, or the like, for atomizing gasoline and 12 designates an intake manifold or other part of an automobile capable of producing a suction. An upper fluid container is shown at 13 and, in gasoline supply systems may constitute a pump chamber which is situated above the lower fluid container 10 and above carbureter 11. A chamber 14 is situated above carbureter 11 and is so positioned relative to upper container 13 that liquid can flow by gravity from the upper container to the chamber. A conduit 15 connects lower container 10 with upper container 13. The connection to container 10 is near the bottom thereof and the connection to upper container 13 is at an intermediate position. A conduit 16 is connected to the bottom part of upper container 13, extends downwardly to below container 10 and upwardly again to chamber 14. It is connected to chamber 14 near the top thereof. A conduit 17 is connected to chamber 14 at an intermediate point, extends downwardly to a point somewhat above the connection of conduit 15 with the lower container, and extends upwardly again and is connected to the upper part of upper container 13. The entrance portion of this conduit into reservoir 14 is turned down as shown.

Lower container 10 is fitted with a horizontal partition 18. Above this partition is an expansion compartment 19 and below it is the space 20 for gasoline. A pipe 21 extends down into space 20 and affords an opening through partition 18 connecting space 19 with space 20. This pipe extends to a point near the bottom of the lower container. A valve 22 is provided near the top of chamber 20 opening into the atmosphere to let air out of space 20 when gasoline is being put in and to show when the gas tank is full. Cap 23 is provided for the lower container having a vent 24 in the same.

A vent pipe 25 is connected to the upper part of chamber 14 and is open to the atmosphere. Chamber 14 has a priming opening 26 covered by a suitable cap. A conduit 27 connects the top of upper container 13 with manifold 12. In this conduit is a restriction 28.

The drawing is intended to show relative heights of the conduits for the positions of lower container 10, upper container 13 and chamber 14 as shown. Parts 13 and 14 may be moved up or down relative to lower container 10 but the bottom of the loop made by conduit 17 should be approximately the same. Loop 16 can extend down any distance so long as the distance between the bottom of loop 17 and its connection to upper container 13 does not exceed the distance between the bottom of loop 16 and its connection to chamber 14.

A conduit 29 connects chamber 14 with carbureter 11 and may be shut off by stop-cock 30.

The operation is as follows:

When first put into use, the system is primed through the filling connection 26. Gasoline is passed into the system until it rises as far as connection 26. In priming the system, the gasoline first runs into chamber 14 and rises therein until the level reaches the connection of conduit 17 thereto. It then passes into conduit 17 and fills the loop made by conduit 17 so that the level is the same in the two branches. The gasoline then continues to rise in chamber 14 until the level reaches the connection thereto of conduit 16. At this time the gasoline overflows into conduit 16 and into upper container 13. The pump chamber 13 is now filled to the level of E'—E'. This completes the priming operation.

The priming opening 26 is closed and stop-cock 30 is now opened, whereupon gasoline flows to the carbureter and the motor of the automobile may now be started.

As the motor revolves, a partial vacuum is produced in intake manifold 12 due to the suction strokes of the pistons. This suction is transmitted through conduit 27 and the air in upper container 13 is sucked into manifold 12 through orifice 28. This orifice is small so that only a small quantity of air flows through it. This cuts down the fluctuations in pressure due to the varying speeds of the motor.

As the pressure in upper container 13 is reduced, gasoline is drawn into it from chamber 14 through pipe loop 16 until the level falls below the point of connection of conduit 16 with chamber 14. Flow of gasoline then continues through pipe loop 17 until the level is further reduced to below the connection of conduit 17 with chamber 14 whereupon air is drawn into conduit 17 by way of vent pipe 25 and the level in the side of loop 17 connected to chamber 14 falls to, for example, C″—C″.

At this time pressure is so reduced in upper container 13 that gasoline begins to flow into container 13 from lower container 10 through conduit 15. The vents 24 and 25 permit this action. During this time the level in the side of loop 16 connected to chamber 14 has also fallen to a point, for example, D′—D′.

The lower container 10 is so constructed that it offers a constant flow level at the bottom of conduit 21 inasmuch as the main body of gasoline in space 20 cannot be drawn into conduit 15 until air is sucked below the bottom opening of pipe 21. The pressure at the entrance to conduit 15 is, therefore, always the same and is determined by the difference between the level of the connection of conduit 15 with lower container 10 and the level of the bottom of conduit 21. When lower container 10 is filled it is necessary to open cock 22 so that air in space 20 may escape as the gasoline runs in. Gasoline is not allowed to rise into chamber 19 when the tank is filled. If, as in warm weather, air in space 20 expands, the expansion of this air will merely force a certain quantity of gasoline up through conduit 21 and into chamber 19. This gasoline will be at once drawn back through conduit 21 as soon as the motor is put into operation. Due to the constant flow level in the lower container, the level C″—C″ is fixed and level D′—D′ is substantially constant during flow from the lower container 10 into upper container 13 until the level in upper container 13 rises above the point of connection of conduit 15 therewith. When the level rises above this point in upper container 13, the height in conduit 15 is increased and the levels C″—C″ and D′—D′ fall further. This continues until level C″—C″ reaches the bottom of the loop 17. When this occurs the liquid column in this trap or seal is broken. The gasoline quickly leaves loop 17, flowing into upper container 13 and air passes freely through loop 17 from the vent 25 and into upper container 13. The pressure is now equalized and the level of gasoline drops in upper container 13. The level in conduit 15 drops down to the level K′—K′ which is at the same level as the bottom of conduit 21. At this time gasoline returns through conduit 15 to lower container 10. Gasoline flows through loop 16 from the bottom of upper container 13 and into chamber 14. This flow continues until a level is reached in chamber 14 equal to the point of connection of conduit 17 therewith, at which time gasoline by-passes from chamber 14 back into upper container 13 through conduit 17 inasmuch as, in filling conduit 17, upper container 13 is no longer vented to the atmosphere. Thus the operation begins over again. In order to insure that enough gasoline enters loop 17 from chamber 14 to give sufficient liquid head in loop 17 between upper container 13 and chamber 14, the right hand branch of loop 17 is made of greater diameter than the left hand branch in order to hold a greater volume of liquid per unit height. The increase of diameter should be sufficient to assure sufficient liquid in the loop to more than fill the left hand branch. Furthermore the end of conduit 17 entering chamber 14 is bent downwardly and has a horizontal opening. This aids in filling loop 17 because surface tension will cause liquid to enter conduit 17 even after the true level has dropped below the conduit opening. As the chamber 14 is many times wider than conduit 17 this causes an appreciable quantity of liquid to be drawn into conduit 17 from below the conduit opening. It is, therefore, seen that an intermittent action is obtained in which a pressure differential is intermittently produced balanced by a plurality of liquid columns which lifts gasoline from lower container 10 to upper container 13 and then one of the liquid columns is broken, namely, the column in loop 17, so that the pressure is equalized. At this time gasoline runs into chamber 14 from upper container 13 by gravity. The lower part of chamber 14 serves as a carryover between the intermittent portions to give continuous feed for the carbureter.

It will be noted that upper container 13 is larger than chamber 14 so that no matter how fast gasoline is drawn into the carbureter the chamber 14 may be filled in one surge up to the point of connection of conduit 17 therewith. If but little gasoline is being used, the reserve by-passes through conduit 17 with little or without any being drawn from the lower container 10.

In order that differences in pressure due to varying motor speeds will have the minmum of influence, the conduits 15 and 17 should be designed with large diameters to permit high flow at low pressure.

When installed in an automobile the two loops 16 and 17 should be extended back to the vicinity of the lower container so that in going up and down hill the relative level values will remain unchanged.

As is shown in Fig. 2, instead of making the right hand branch of loop 17 of larger diameter than the left hand branch, I may employ an enlargement in the right hand branch as by forming part of this branch as a coil 31. With proper dimensions of the parts and the downturned opening of conduit 17 into chamber 14, such enlargement may be unnecessary.

It will be obvious that the novel method of raising liquid herein disclosed may be used to lift other liquids than gasoline and, further, that variations of structure are possible within the spirit and scope of the invention.

What I claim is:

1. Vacuum apparatus for lifting liquid comprising a lower fluid container, an upper fluid container situated above said lower container, a chamber situated to permit flow of liquid by gravity from the upper container to the chamber, means for discharging liquid from said chamber, and means to intermittently build up a difference of pressure between the upper container on the one hand and the chamber and the lower container on the other hand to lift liquid from the lower container to the upper container and to intermittently equalize the difference of pressure to permit liquid to flow from the upper container to the chamber comprising a conduit connecting a lower part of the upper container with a higher part of the chamber and forming a loop below the upper container and chamber, and a conduit connecting a higher part of the upper container with an intermediate part of the chamber forming a loop below the upper container and the chamber.

2. Vacuum apparatus for lifting liquid comprising a lower container, an upper container situated above said lower container, a conduit connecting said lower container with said upper container, means in said lower container for maintaining a constant pressure at the point of connection with said conduit, a chamber situated to permit flow of liquid from said upper container to said chamber, means to intermittently build up a difference of pressure between the upper container on the one hand and the chamber and the lower container on the other hand to lift liquid from the lower container to the upper container and to intermittently equalize the difference of pressure to permit liquid to flow from the upper container to the chamber, and means for discharging liquid from said chamber.

3. Vacuum apparatus for lifting liquid comprising a lower container, an upper container situated above said lower container, a conduit connecting said lower container with said upper container, means in said lower container for maintaining a constant pressure at the point of connection with said conduit, a chamber situated to permit flow of liquid from said upper container to said chamber, means for discharging liquid from said chamber, and means to intermittently build up a difference of pressure between the upper container on the one hand and the chamber and the lower container on the other hand to lift liquid from the lower container to the upper container and to intermittently equalize the difference of pressure to permit liquid to flow from the upper container to the chamber comprising a conduit connecting a lower part of the upper container and the chamber forming a loop below the upper container and the chamber, and a conduit connecting a higher part of the upper container with an intermediate part of the chamber forming a loop below the upper container and the chamber.

4. A fluid system comprising a lower fluid container, an upper fluid container, a conduit between said containers, a chamber, means for maintaining a common pressure in the upper portions of the chamber and the lower container, a connection between the chamber and second container for intermittently relieving the pressure in the chamber, and a connection between the chamber and second container for refilling the chamber with liquid during the period that the pressure therein is relieved, said connection being of such character that the column formed by the refilling liquid balances the hydrostatic head of the column of liquid in the first conduit.

5. A fluid system comprising a lower fluid container, an upper fluid container, a conduit between said containers, a chamber, a communication between the upper portions of the chamber and the lower container, a connection between the chamber and second container for intermittently relieving the pressure in the chamber, and a connection between the chamber and second container for refilling the chamber with liquid during the period that the pressure therein is relieved said connection being of such character that the column formed by the refilling liquid balances the hydrostatic head of the column of liquid in the first conduit.

6. Fluid apparatus comprising a lower container, an upper container above the lower container, a chamber situated to permit flow of liquid by gravity from the upper container to the chamber, and means to intermittently build up a difference of pressure between the upper container on the one hand and the chamber and lower container on the other hand to lift liquid from the lower container to the upper container and to intermittently equalize the difference of pressure to permit liquid to flow from the upper container to the chamber comprising a conduit connecting the upper container with the chamber and forming a loop below the upper container and chamber, and a conduit connecting the upper container with the chamber forming a loop below the upper container and chamber.

7. Fluid apparatus comprising a lower container, an upper container above the lower container, a chamber situated to permit flow of liquid by gravity from the upper container to the chamber, and means to intermittently build up a difference of pressure between the upper container on the one hand and the chamber and lower container on the other hand to lift liquid from the lower container to the upper container and to intermittently equalize the difference of pressure to permit liquid to flow from the upper container to the chamber comprising a conduit connecting a lower part of the upper container with a higher part of the chamber and forming a loop between the upper container and chamber, and a conduit connecting the upper container with an intermediate part of the chamber forming a loop below the upper container and chamber.

8. A supply tank for a fluid system comprising a container formed with a filler opening, a horizontal partition in the tank below the opening, a pipe extending downwardly from the partition, an outlet adjacent the bottom of the tank and a valve adjacent the top of the chamber under the partition.

9. A supply tank for a fluid system comprising a container formed with a filler opening, a horizontal partition in the tank below the opening, a pipe extending downwardly from the partition adjacent the bottom of the tank, an outlet in the bottom of the tank and extending upwardly above the level of the bottom of the pipe, and a valve adjacent the top of the chamber under the partition.

10. A fluid system comprising an upper container, a lower container, a liquid seal subjected to the pressures of the two containers and communication with one of the containers, means for producing a lower pressure in the upper container than in the lower container, and means responsive to the hydrostatic head of the column of the liquid seal for breaking the seal intermittently.

DONALD BRANCH KNIGHT.